US012807746B2

(12) United States Patent
Shi et al.

(10) Patent No.: US 12,807,746 B2

(45) Date of Patent: Nov. 24, 2026

(54) BIPHASIC POLYMERIZATION PROCESSES

(71) Applicant: ExxonMobil Chemical Patents Inc., Baytown, TX (US)

(72) Inventors: Jun Shi, Houston, TX (US); Jay L. Reimers, Houston, TX (US); Yifeng Hong, Houston, TX (US); Keifer D. Slaton, Ridgeland, MS (US); Adrian G. Barry, Houston, TX (US); Vetkav R. Eswaran, Houston, TX (US); Brian R. Greenhalgh, Houston, TX (US); Stacy Jordahl, Webster, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 556 days.

(21) Appl. No.: 18/559,095

(22) PCT Filed: Apr. 26, 2022

(86) PCT No.: PCT/US2022/026263

§ 371 (c)(1),
(2) Date: Nov. 6, 2023

(87) PCT Pub. No.: WO2022/250822

PCT Pub. Date: Dec. 1, 2022

(65) Prior Publication Data

US 2024/0239929 A1 Jul. 18, 2024

Related U.S. Application Data

(60) Provisional application No. 63/192,287, filed on May 24, 2021.

(51) Int. Cl.

*C08F 10/06* (2006.01)
*C08F 2/01* (2006.01)

(Continued)

(52) U.S. Cl.

CPC .............. *C08F 210/06* (2013.01); *C08F 2/01* (2013.01); *C08F 2/06* (2013.01); *C08F 210/02* (2013.01)

(58) Field of Classification Search

None

See application file for complete search history.

(56) References Cited

U.S. PATENT DOCUMENTS 5,041,584 A 8/1991 Crapo et al.
5,153,157 A 10/1992 Hlatkey et al.

(Continued)

FOREIGN PATENT DOCUMENTS

CN 207685180 8/2018
CN 207685180 U * 8/2018

(Continued)

OTHER PUBLICATIONS

Gregory S. Girolami, “A Simple ‘Back of the Envelope’ Method for Estimating the Densities and Molecular Volumes of Liquids and Solids,” Journal of Chemical Education, v.71(11), pp. 962-964, (Nov. 1994).

(Continued)

*Primary Examiner* — Richard A. Huhn

(74) *Attorney, Agent, or Firm* — Fletcher Yoder, P.C.

(57) ABSTRACT

The present disclosure relates to a process including introducing a feed to a catalyst and an activator to provide a solution in a continuous or semi-continuous reactor. The feed can include a solvent, and a first monomer that is propylene. The reactor can include polymerization conditions including a pressure of about 1 MPa to about 5 MPa and/or a temperature of about 60 °C to about 120 °C. The solution can be circulated to form a biphasic product including a first portion and a second portion, the first portion having a propylene based polymer having a polydispersity (Continued)

index of about 1.5 to about 15, and weight average molecular weight (Mw) of about 50,000 g/mol or greater, according to GPC-4D.

20 Claims, 3 Drawing Sheets

(51) Int. Cl.

| | |
|---|---|
| ***C08F 2/06*** | (2006.01) |
| ***C08F 210/02*** | (2006.01) |
| ***C08F 210/06*** | (2006.01) |

(56) References Cited

U.S. PATENT DOCUMENTS

| | | | |
|---|---|---|---|
| 5,453,410 | A | 9/1995 | Kolthammer et al. |
| 5,942,459 | A | 8/1999 | Sugano et al. |
| 6,180,829 | B1 | 1/2001 | Strauss et al. |
| 6,211,105 | B1 | 4/2001 | Holtcamp |
| 6,555,632 | B1 | 4/2003 | Zandona |
| 6,833,417 | B2 | 12/2004 | Ehrman et al. |
| 6,989,344 | B2 | 1/2006 | Cann et al. |
| 7,202,313 | B2 | 4/2007 | Jorgensen et al. |
| 7,247,687 | B2 | 7/2007 | Cherkasov et al. |
| 7,354,979 | B2 | 4/2008 | Brant et al. |
| 7,915,357 | B2 | 3/2011 | Cann et al. |
| 8,101,691 | B2 | 1/2012 | Goode et al. |
| 8,318,875 | B2 | 11/2012 | Mehta et al. |
| 8,658,556 | B2 | 2/2014 | Stewart |
| 8,957,159 | B2 | 2/2015 | Jiang et al. |
| 9,303,103 | B2 | 4/2016 | Moorhouse et al. |
| 9,970,869 | B2 | 5/2018 | Schwerdtfeger et al. |
| 9,994,656 | B2 | 6/2018 | Vestberg et al. |
| 11,643,608 | B2 | 5/2023 | Osby et al. |
| 2008/0090974 | A1 | 4/2008 | Brant et al. |
| 2016/0362506 | A1* | 12/2016 | Costin .................. C08F 210/16 |

FOREIGN PATENT DOCUMENTS

| | | | |
|---|---|---|---|
| WO | 1994/07928 | A1 | 4/1994 |
| WO | 1995/014044 | A1 | 5/1995 |
| WO | 2008-109212 | A1 | 9/2008 |

OTHER PUBLICATIONS

T. Sun et al., "Effect of Short Chain Branching on the Coil Dimensions of Polyolefins in Dilute Solution", Macromolecules, vol. 34, No. 19, pp. 6812-6820, (2001).

* cited by examiner

BIPHASIC POLYMERIZATION PROCESSES

CROSS REFERENCE TO RELATED APPLICATIONS

This application is a national stage application under 35 USC 371 of International Application No. PCT/US2022/026263 filed on Apr. 26, 2022, which claims the benefit of priority of U.S. Provisional Application No. 63/192,287, filed May 24, 2021, the disclosure of each of which is incorporated herein by reference in its entirety.

FIELD

The present disclosure generally relates to processes for biphasic polymerization using continuous or semi-continuous reactors.

BACKGROUND

Olefin-based polymers and copolymers can be produced in large scale operations using solution polymerization. Continuous stirred-tank reactors and loop reactors are two commonly used reactor configurations in solution polymerization processes. The process operating window is determined by multiple factors which include catalyst performance, target product properties, temperature and pressure range depending on equipment design, etc. One consideration used to determine the operating window is the phase diagram of the solution mixture. Solution polymerization is often controlled within a narrow operating window in order to maintain a single liquid phase to meet final product property specifications. Operating within a wide operating window allows the ability to customize the process conditions and equipment design which can reduce operating costs.

Thus, there is a need for solution polymerization systems and processes that allow for an expanded polymerization operating window to produce polyolefins.

SUMMARY

In an embodiment, a process for polymerization includes introducing a feed including a solvent, a first monomer that is propylene to a continuous or semi-continuous reactor under reactor conditions including a pressure of about 1 MPa to about 5 MPa and a temperature of about 60 °C to about 120 °C. The process includes introducing a catalyst system to the feed to form a biphasic product including a first portion and a second portion, the first portion including a propylene based polymer having a polydispersity index of about 1.5 to about 15 and molecular weight of about 50,000 g/mol or greater, according to GPC-4D.

In an embodiment, a process for polymerization includes introducing a solvent, a first monomer, and a second monomer to a catalyst and an activator to form a solution in a continuous loop reactor under polymerization conditions including a pressure of about 1 MPa to about 5 MPa and a temperature of about 60 °C to about 120 °C. The process includes mixing the solution to form a biphasic product and measuring a turbidity of the biphasic product. The process includes adjusting or maintaining at least the pressure or the temperature of the reactor to increase or maintain the turbidity of the biphasic product to greater than 120 NTU as measured by a turbidity meter coupled to an outlet of the reactor. The biphasic product comprises a polymer having a polydispersity index of about 2.3 or less and molecular weight of from about 180,000 g/mol to about 200,000 g/mol, according to GPC-4D.

In another embodiment, a process for polymerization includes introducing a feed comprising a solvent, a first composition including propylene and an optional first comonomer to a continuous or semi-continuous reactor. The process includes introducing a catalyst composition to the reactor at a first catalyst flow rate to provide a first solution. The process includes mixing the first solution at a first set of operating conditions including a first temperature and a first pressure to form a first product. The process includes transitioning the reactor to a second set of operating conditions to form a second solution. The transitioning includes adjusting the reactor to a second pressure of about 1 MPa to about 5 MPa; adjusting the reactor to a second temperature of about 60 °C to about 120 °C; adjusting the first composition to a second composition including propylene and an optional second comonomer that is the same or different than the first comonomer; and/or adjusting the first catalyst flow rate of the catalyst composition to a second catalyst flow rate. The process includes mixing the second solution to form a second biphasic product, the second biphasic product having a turbidity of greater than 120 NTU as measured by a turbidity meter coupled to an outlet of the reactor, the second product comprising a polymer having a polydispersity index of about 1.5 to about 15 and molecular weight of about 50,000 g/mol or greater, according to GPC-4D.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Figure 1:
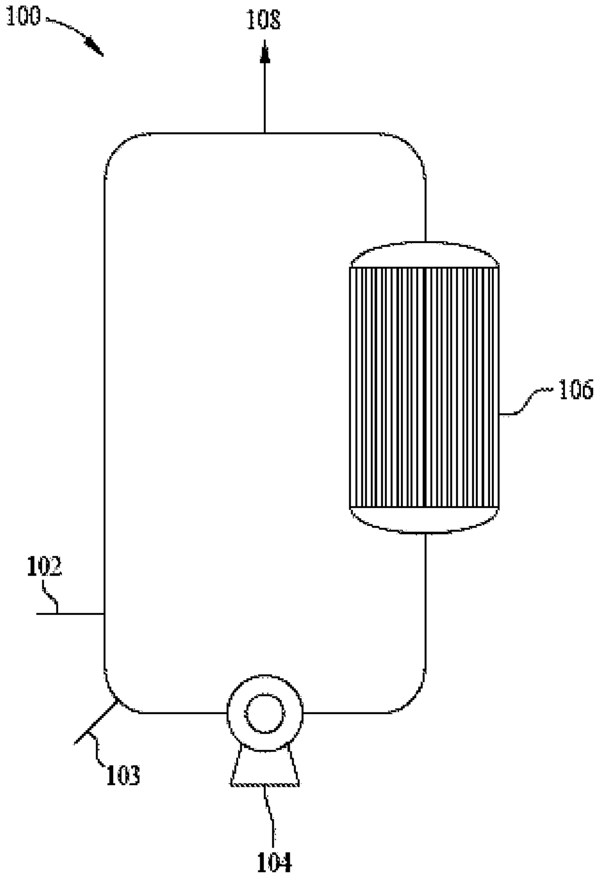
FIG. 1 depicts an example continuous loop reactor, in accordance with an embodiment of the present disclosure.

The present disclosure relates to biphasic polymerization processes, which expand the operating window of the existing solution polymerization processes while producing a product with adequate or enhanced product properties.

Systems used in processes of the present disclosure can include continuous or semi-continuous reactors, such as a continuous stirred tank reactor, or a continuous loop reactor. Processes of the present disclosure can include introducing a feed to a continuous or semi-continuous reactor under solution polymerization conditions. The feed can include one or more monomers such as alpha olefins, hydrogen, transfer agent, and a solvent. The reactor conditions include a pressure of about 1 MPa to about 5 MPa and a temperature of about 60 °C to about 120 °C, such as about 80 °C to about 110 °C. The feed including the monomer and solvent can be mixed in the reactor to form a solution at the reactor conditions and the catalyst and activator can be added to form a biphasic product. The biphasic product has a first portion including a polymer having a polydispersity index of about 1.5 to about 15, such as about 2.0 to about 10, such as about 2.0 to about 5, or about 2.5 to about 10 and weight average molecular weight (Mw) of about 50,000 g/mol or greater, such as about 100,000 g/mol or greater, such as about 150,000 g/mol or greater, such as about 200,000 g/mol or greater, such as about 300,000 g/mole or greater, such as about 400,000 g/mol or greater, according to GPC-4D.

The term "polymer" includes, but is not limited to, homopolymers, copolymers, terpolymers, etc., and alloys and blends thereof. The term "polymer" also includes impact, block, graft, random, and alternating copolymers. The term "polymer" shall further include all possible geometrical configurations unless otherwise specifically stated. Such configurations may include isotactic, syndiotactic and random symmetries.

The term "copolymer" is meant to include polymers having two or more monomers, optionally, with other monomers, and may refer to interpolymers, terpolymers, etc.

The term "blend" refers to a mixture of two or more polymers.

The term "monomer", can refer to the monomer used to form a polymer, including the unreacted chemical compound in the form prior to polymerization, and/or the monomer after it has been incorporated into the polymer. Different monomers are discussed herein, including propylene monomers and ethylene monomers. Other monomers that can be used include butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, indene, styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

The term "comonomer" can refer to a second monomer used to form a polymer, including the unreacted chemical compound in the form prior to polymerization, and the comonomer after it has been incorporated into the polymer.

Solution Polymerization

A solution polymerization is a polymerization process in which one or more monomers are polymerized in the presence of a catalyst system under conditions to obtain an effluent in which unreacted monomers and polymer are dissolved in a liquid polymerization medium, such as an inert solvent or monomer(s) or their blends. Solution polymerization can involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. A solution polymerization is typically homogeneous. A homogeneous polymerization is one where the polymer product is dissolved in the polymerization medium. Such systems are typically not turbid as described in J. Vladimir Oliveira, C. Dariva and J. C. Pinto, Ind. Eng, Chem. Res. 29, 2000, 4627.

In contrast to typical solution polymerization systems, the systems and processes provided herein do not produce a single phase, homogeneous medium. Instead, the medium disclosed herein includes multiple liquid phases, such as two liquid phases (e.g., biphasic). A measure of homogeneity can include "turbidity" measured in nephelometric turbidity units (NTU). In some embodiments, the system disclosed herein can include a turbidity meter (such as the Model TF16-EX-HT from Opteck), such as a nephelometer disposed near the product outlet stream which can measure turbidity in real time. The nephelometer includes a light detector and a light beam, the light detector can be used to measure the intensity of light scatter within a sample when exposed to the light beam. A single phase medium can have a steady, low turbidity, such as a turbidity of less than 120 NTU, such as less than 110 NTU, such as about 105 NTU. A biphasic medium can have an unsteady, high turbidity, such as a turbidity of greater than 120 NTU, such as about 125 NTU to about 500 NTU, such as about 125 NTU to about 135 NTU, or about 170 NTU to about 180 NTU. In some embodiments, the medium is a biphasic product which includes a first portion and a second portion. The first portion can be a polymer "rich" phase and the second portion can be a polymer "lean" phase. In some embodiments, the biphasic product includes about 20 wt % to 40 wt % of the first liquid phase and about 70 wt % to about 80 wt % of the second liquid phase, based on the weight of the biphasic product.

In some embodiments, the first portion can include solvent and less than 50 wt %, or about 5 wt % to about 50 wt % of unreacted monomer, such about 10 wt % to about 40 wt % of unreacted monomer, based on the total weight of the first portion. In some embodiments, the first portion can include about 5 wt % to about 30 wt % polymer, such as about 10 wt % to about 30 wt %, such as about 13 wt % to about 17 wt % polymer, based on the total weight of the first portion. In some embodiments, the second portion can include solvent and about 25 wt % to about 55 wt % of unreacted monomer such as about 35 wt % to about 45 wt % of unreacted monomer, based on the total weight of the second portion. In some embodiments, the second portion can include about 0 wt % to about 5 wt % polymer, based on the total weight of the second portion.

Suitable processes can operate at temperatures from about 60 °C to about 120 °C, such as about 80 °C to about 110 °C, such as about 80 °C to about 95 °C, alternatively about 95 °C to about 110 °C, and/or at pressures of about 0.1 MPa or greater, such as about 1 MPa to about 5 MPa, such as about 3 MPa to about 4.8 MPa. The operating pressure of the present disclosure shifts the typical operating conditions to a liquid-liquid region to produce biphasic product. Temperature control in the reactor can generally be obtained by balancing the heat of polymerization and with reactor cooling by reactor jackets or cooling coils to cool the contents of the reactor, auto refrigeration and/or pre-chilled feeds. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. The solvent can be kept in the liquid phase and introduced as a liquid. Solvent can be introduced in the feed to the polymerization reactors. The solvent can be an aromatic solvent, aliphatic solvent, or combination(s) thereof. The solvent can be 2-methylpentane, isohexane, or other solvents used in polymerization reactors. The feed can be controlled by adjusting individual inlet flow rate, while the reactor composition and product stream composition can be calculated based on the production rate and the product chemical composition. The feed can include a single monomer, or can include a first and second monomer, or more than two monomers. In some embodiments using more than one monomer, the monomers can be introduced to the reactor simultaneously in a single feed, or the monomers can be introduced using distinct inlets, or the monomers can be introduced in sequence with one another in a single inlet.

A catalyst system can be injected to the reactor at an inlet different from the feed inlet. The catalyst composition can include an activator.

A process described herein can be a solution polymerization process that may be performed in a batch wise fashion (e.g., batch; semi-batch) or in a continuous process. Suitable reactors may include tank, loop, and tube designs. In some embodiments, the process is performed in a continuous fashion and dual loop reactors in a series or parallel configuration are used. In at least one embodiment, the process is performed in a continuous fashion and dual continuous stirred-tank reactors (CSTRs) in a series configuration can be used, alternatively, CSTRs in a parallel configuration can be used. Furthermore, the process can be performed in a continuous fashion and a tube reactor can be used. In another embodiment, the process is performed in a continuous fashion and one loop reactor and one CSTR are used in a series or parallel configuration. The process can also be performed in a batch wise fashion and a single stirred tank reactor can be used.

FIG. 1 depicts an example continuous loop reactor 100, in accordance with an embodiment of the present disclosure. In operation, one or more feeds can be introduced to the continuous loop reactor 100 at a first inlet or first set of inlets 102. The feed can include a solvent, and at least one monomer, such as a first monomer and a second monomer. The heat of reaction can be removed by pre-cooling the feed and/or by cooling the reactor 100 using one or more heat exchangers 106, such as reactor jackets or cooling coils. In some embodiments, at least one heat exchanger 106 with tempered cooling medium on the utility side can be placed along the loop reactor. One or more temperature sensors can be disposed at an inlet of the reactor, an outlet of the reactor, and along the reactor to monitor the temperature gradient throughout the reactor 100.

A catalyst system can be introduced to the reactor 100 at the first inlet 102 or at a second inlet 103 to form a solution with the feed. The catalyst system can include a catalyst and an activator. In some embodiments, the catalyst can be introduced to the reactor 100 followed by the activator. In some embodiments, the activator can be introduced to the reactor at a different inlet from the catalyst. The solution can be circulated using a recirculation pump 104 in the reactor 100 under polymerization conditions to form a biphasic product that can exit the reactor at outlet 108. The recirculation pump 104 can control the recycle ratio of the solution inside the loop and new feed. The recirculation pump speed can be adjusted relative to the feed flow rate in order to maintain or adjust the recycle ratio. In some embodiments, a first monomer can be introduced at about 0% to about 100% of the total feed by volume, such as about 20% to about 80%, such as about 40% and/or a second monomer can be introduced at about 0% to about 100% of the total feed by volume, such as about 20% to about 80%, such as about 40%. In some embodiments, a recycle stream can be introduced at about 0% to about 95%, such as about 5% to about 20%, of the total feed by volume.

The first monomer can be propylene, the second monomer (e.g., comonomer) can be ethylene, and biphasic product can include a homopolymer of polypropylene, a homopolymer of polyethylene, a copolymer of polypropylene and polyethylene, unreacted monomers, solvent, or combination(s) thereof. In some embodiments, the biphasic product includes a copolymer, the copolymer can include about 5 wt % to about 98 wt % polypropylene, such as about 50 wt % to about 90 wt %, such as about 60 wt % to about 80 wt %, such as about 70 wt %. In some embodiments, the biphasic product includes a copolymer, the copolymer can include about 5 wt % to about 95 wt % polyethylene, such as about 5 wt % to about 95 wt % polyethylene, such as about 10 wt % to about 50 wt % polyethylene, such as about 15 wt % to about 40 wt %, such as about 20 wt % to about 30 wt %, such as about 30 wt % polyethylene.

A turbidity meter can be coupled near the outlet 108 or at the outlet 108 to monitor the turbidity of the mixture inside the reactor and/or the biphasic product. The polymerization can occur inside the loop of the reactor under polymerization conditions. The polymerization conditions can include a pressure of about 1 MPa to about 5 MPa and/or a temperature of about 60 °C to about 120 °C, such as about 80 °C to about 110 °C. The biphasic product can include a polymer with a polydispersity index of about 1.5 to about 15, such as about 2.0 to about 10, such as about 2.0 to 5, or 2.5 to 10 and weight average molecular weight (Mw) of about 50,000 g/mol or greater, such as about 100,000 g/mol or greater, such as about 150,000 g/mol or greater, such as about 200,000 g/mol or greater, such as about 300,000 g/mole or greater, such as about 400,000 g/mol or greater, according to GPC-4D.

Figure 2:
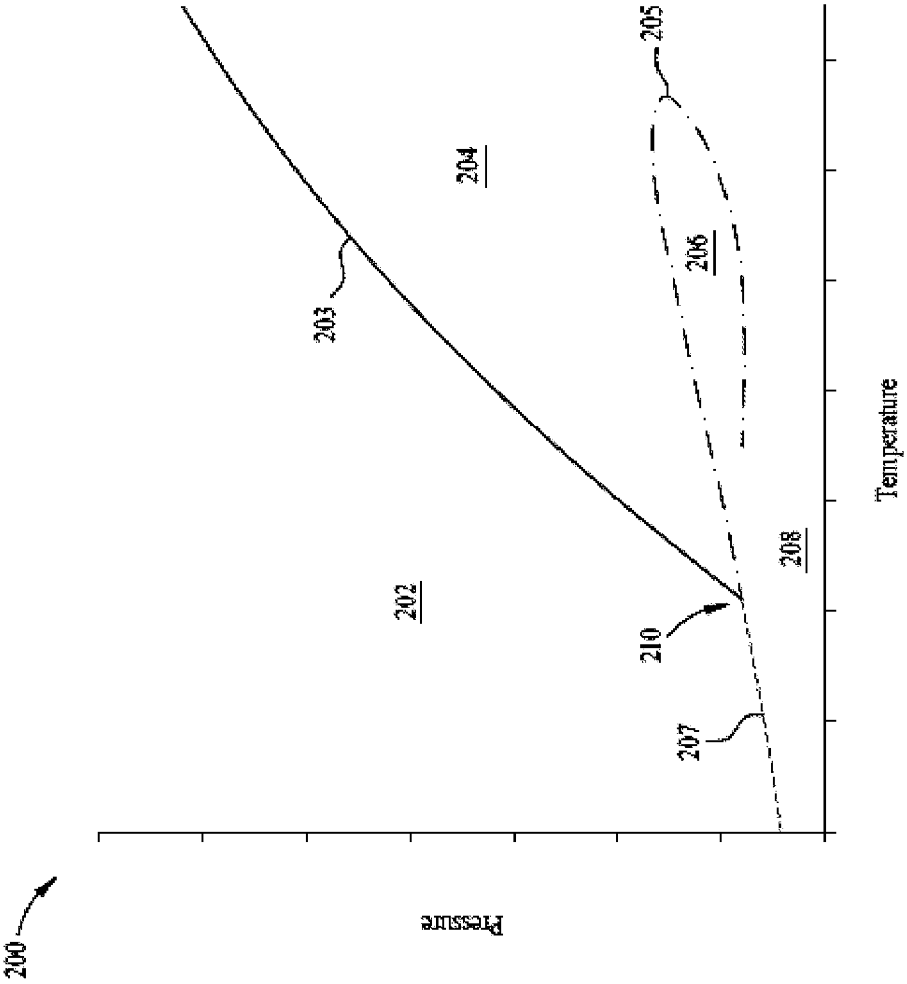
FIG. 2 depicts a phase diagram of an example solution polymerization with an example polymer composition including propylene and ethylene, in accordance with an embodiment of the present disclosure.

FIG. 2 depicts a phase diagram of an example polymerization with an example polymer composition including propylene and ethylene, in accordance with an embodiment of the present disclosure. The phase diagram depicts several regions representing different phases under certain temperatures and pressures. The phase diagram includes a single liquid region 102, a biphasic liquid region 104, and a single/biphasic equilibrium 103 joining the single liquid region 102 with the biphasic liquid region 104. The depicted regions further include a vapor-biphasic region 106 and a vapor region 108, joined by a vapor/vapor-biphasic equilibrium 105. The vapor/vapor-biphasic equilibrium 105 further joins the vapor-biphasic region 106 and the biphasic region 104. The single liquid region 102 is joined with the vapor phase at vapor/liquid equilibrium 107. All of the phases (e.g., 102, 104, 106, 108) and equilibrium lines (e.g., 103, 105, 107) overlap at a single lower critical solution temperature (LCST) 110. In particular, the LCST is a theoretical operating condition at a particular pressure and particular temperature at which all of the phases are present in equilibrium.

An operating window for a comparative single liquid phase process can be represented by a portion of the single liquid region 102 above the single/biphasic equilibrium 103. In contrast, the operating window for an example biphasic liquid process can be represented by a portion of the biphasic liquid region 104 at temperatures and pressures above a lower critical solution temperature (LCST) 110 and below the single/biphasic liquid equilibrium 103. In some embodiments, the operating window for the example solution polymerization can be a wide operating window including both the single phase region 102 and the biphasic region 104 as depicted by FIG. 1. Processes using different monomers, polymers, catalysts, and/or solvents can have LCST at different temperatures and pressures. The biphasic processes of the present disclosure can be in operating windows with pressures and temperature close to the LCST temperature and pressure of the biphasic product. In some embodiments, the biphasic process can include operating windows about 1 °C to about 100 °C above the LCST temperature of the biphasic product, such as about 1 °C to about 50 °C, such as about 5 °C to about 30 °C, such as about 10 °C to about 25 °C, such as about 15 °C to about 25 °C above the LCST temperature of the biphasic product. In some embodiments, the biphasic process can include operating windows about 0.1 MPa to about 4 MPa above the LCST pressure of the biphasic product, such as about 0.1 MPa to about 2 MPa, such as about 0.2 MPa to about 0.7 MPa, alternatively about 0.3 MPa to about 1 MPa above the LCST pressure of the biphasic product.

Biphasic Process

Figure 3:
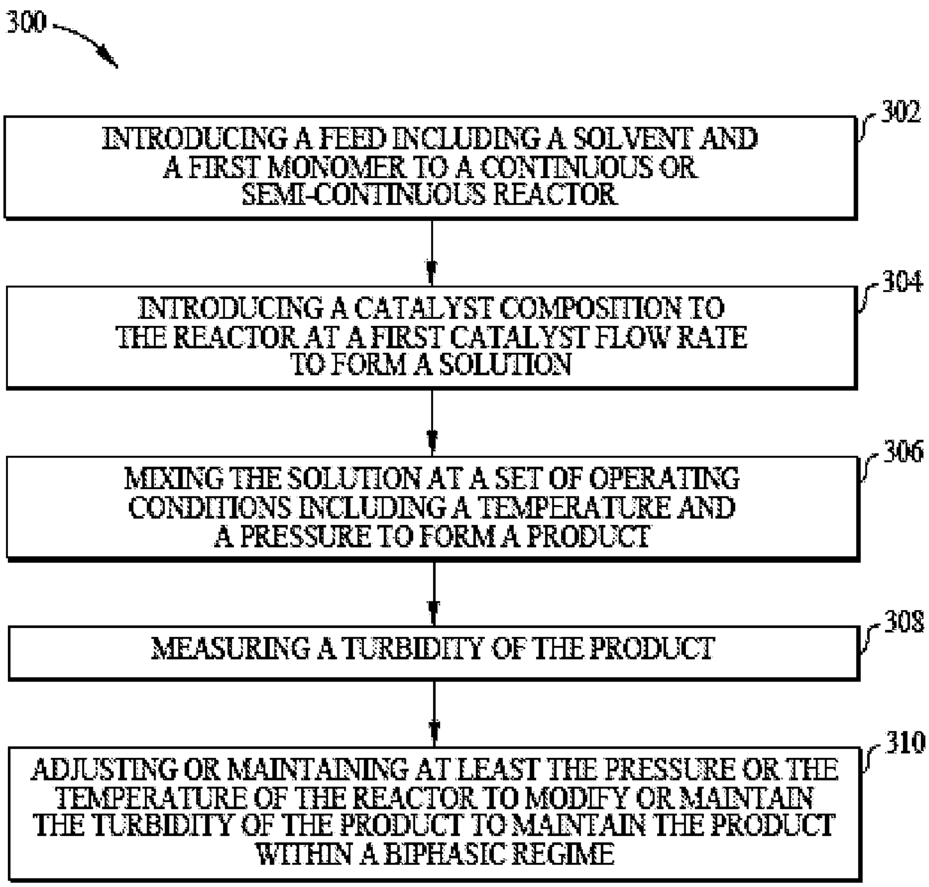
FIG. 3 depicts a flow diagram of an example biphasic process 300, in accordance to an embodiment of the present disclosure.

FIG. 3 depicts a flow diagram of an example biphasic process 300, in accordance to an embodiment of the present disclosure. The process includes:

introducing a feed including a solvent, and a first monomer, to a continuous or semi-continuous reactor (e.g., 302);

introducing a catalyst composition to the reactor at a catalyst flow rate to provide a solution (e.g., 304);

circulating the solution at a set of operating conditions including a temperature and a pressure to form a product (e.g., 306);

measuring a turbidity of the product (e.g., 308); and adjusting or maintaining at least the pressure or the temperature of the reactor to modify or maintain the turbidity of the product to maintain the product within a biphasic regime (e.g., 310).

In some embodiments, introducing a feed and introducing a catalyst composition to a continuous or semi-continuous reactor can include introducing a solvent and at least two monomers to a continuous loop reactor as described herein with reference to FIG. 1. The solution can be mixed at a set of operating conditions to form a biphasic product.

The biphasic product turbidity can be measured and maintained to a turbidity of greater than 120 NTU as measured by a turbidity meter coupled to an outlet of the reactor. The biphasic product can include a polymer having a polydispersity index of about 1.5 to about 15 and weight average molecular weight (Mw) of about 50,000 g/mol or greater, according to GPC-4D.

Catalyst

Any polymerization catalyst capable of polymerizing the monomers disclosed herein can be used including a catalyst that is sufficiently active under the polymerization conditions disclosed herein. In some embodiments, a catalyst formed from a Group 3 to 10 transition metal can be used. A suitable olefin polymerization catalyst is capable of coordinating to, or associating with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

In at least one embodiment, the present disclosure provides a catalyst system comprising a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3 or +4.

A catalyst compound of the present disclosure can be a chromium or chromium-based catalyst. Chromium-based catalysts include chromium oxide ($CrO_3$) and silylchromate catalysts. Chromium catalysts have been the subject of much development in the area of continuous fluidized-bed gas-phase polymerization for the production of polyethylene polymers. Such catalysts and polymerization processes have been described, for example, in U.S. Patent Application Publication No. 2011/0010938 and U.S. Pat. Nos. 7,915,357, 8,129,484, 7,202,313, 6,833,417, 6,841,630, 6,989,344, 7,504,463, 7,563,851, 8,420,754, and 8,101,691.

Metallocene catalyst compounds as used herein include metallocenes comprising Group 3 to Group 12 metal complexes, preferably, Group 4 to Group 6 metal complexes, for example, Group 4 metal complexes. The metallocene catalyst compound of catalyst systems of the present disclosure may be unbridged metallocene catalyst compounds represented by the formula: $Cp^ACp^BM'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof.

The metallocene catalyst compound may be a bridged metallocene catalyst compound represented by the formula: $Cp^A(A)Cp^BM'X'_n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl.

(A) may be O, S, NR', or $SiR'_2$, where each R' is independently hydrogen or $C_1$-$C_{20}$ hydrocarbyl.

In another embodiment, the metallocene catalyst compound is represented by the formula:

$$T_yCp_mMG_nX_q$$

where Cp is independently a substituted or unsubstituted cyclopentadienyl ligand or substituted or unsubstituted ligand isolobal to cyclopentadienyl. M is a Group 4 transition metal. G is a heteroatom group represented by the formula $JR^*_z$ where J is N, P, O or S, and R* is a linear, branched, or cyclic $C_1$-$C_{20}$ hydrocarbyl. z is 1 or 2. T is a bridging group. y is 0 or 1. X is a leaving group. m=1, n=1, 2 or 3, q=0, 1, 2 or 3, and the sum of m+n+q is equal to the oxidation state of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is a bis(phenolate) catalyst compound represented by Formula (I):

(I)

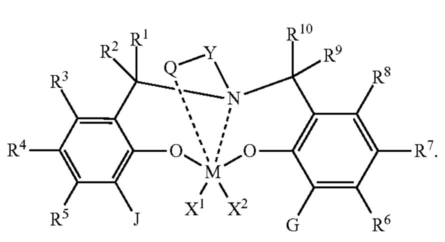

M is a Group 4 metal. $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure. $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof. Q is a neutral donor group. J is heterocycle, a substituted or unsubstituted $C_7$-$C_{60}$ fused polycyclic group, where at least one ring is aromatic and where at least one ring, which may or may not be aromatic, has at least five ring atoms. G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof. Y is divalent $C_1$-$C_{20}$ hydrocarbyl or divalent $C_1$-$C_{20}$ substituted hydrocarbyl or (-Q*-Y—) together form a heterocycle. Heterocycle may be aromatic and/or may have multiple fused rings.

In at least one embodiment, the catalyst compound represented by Formula (I) is represented by Formula (II) or Formula (III):

(II)

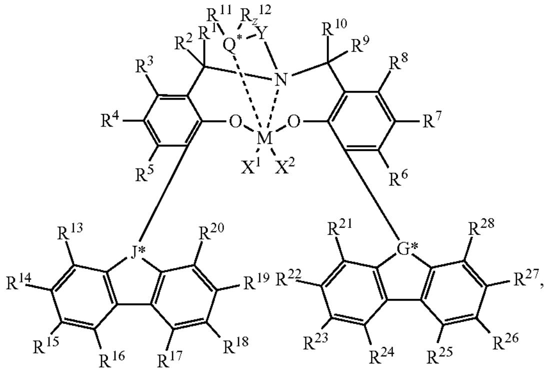

, or

-continued (III)

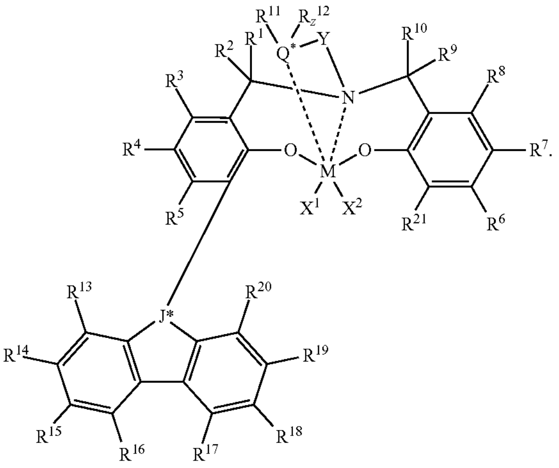

M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (I). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof. $R^{11}$ and $R^{12}$ may join together to form a five- to eight-membered heterocycle. Q* is a group 15 or 16 atom. z is 0 or 1. J* is CR" or N, and G* is CR" or N, where R" is $C_1$-$C_{20}$ hydrocarbyl or carbonyl-containing $C_1$-$C_{20}$ hydrocarbyl. z=0 if Q* is a group 16 atom, and z=1 if Q* is a group 15 atom.

In at least one embodiment the catalyst is an iron complex represented by formula (IV):

(IV)

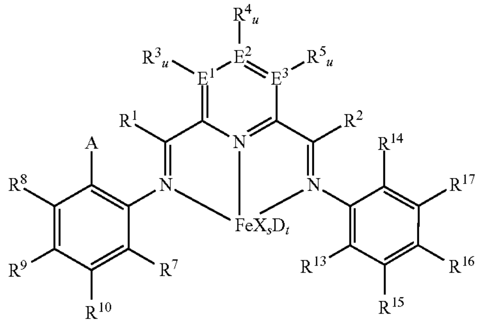

wherein:

A is chlorine, bromine, iodine, —$CF_3$ or —$OR^{11}$, each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;

wherein each of $R^1$ and $R^2$ is optionally substituted by halogen, —$NR^{11}_2$, —$OR^{11}$ or —$SiR^{12}_3$;

wherein $R^1$ optionally bonds with $R^3$, and $R^2$ optionally bonds with $R^5$, in each case to independently form a five-, six- or seven-membered ring;

$R^7$ is a $C_1$-$C_{20}$ alkyl;

each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —$NR^{11}_2$, —$OR^{11}$, halogen, —$SiR^{12}_3$ or five-, six- or seven-membered heterocyclyl comprising at least one atom selected from the group consisting of N, P, O and S;

wherein $R^3$, $R^4$, $R^5$, $R^7$, $R^8$, $R^9$, $R^{10}$, $R^{15}$, $R^{16}$, and $R^{17}$ are optionally substituted by halogen, —$NR^{11}_2$, —$OR^{11}$ or —$SiR^{12}_3$;

wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring comprising at least one atom from the group consisting of N, P, O and S;

$R^{13}$ is $C_1$-$C_{20}$-alkyl bonded with the aryl ring via a primary or secondary carbon atom, $R^{14}$ is chlorine, bromine, iodine, —$CF_3$ or —$OR^{11}$, or $C_1$-$C_{20}$-alkyl bonded with the aryl ring;

each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR^{12}_3$, wherein $R^{11}$ is optionally substituted by halogen, or two $R^{11}$ radicals optionally bond to form a five- or six-membered ring;

each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring, each of $E^1$, $E^2$, and $E^3$ is independently carbon, nitrogen or phosphorus;

each u is independently 0 if $E^1$, $E^2$, and $E^3$ is nitrogen or phosphorus and is 1 if $E^1$, $E^2$, and $E^3$ is carbon, each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR^{18}_2$, —$OR^{18}$, —$SR^{18}$, —$SO_3R^{18}$, —$OC(O)R^{18}$, —CN, —SCN, β-diketonate, —CO, —$BF_4^-$, —$PF_6^-$ or bulky non-coordinating anions, and the radicals X can be bonded with one another;

each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}_3$, wherein $R^{18}$ can be substituted by halogen or nitrogen- or oxygen-containing groups and two $R^{18}$ radicals optionally bond to form a five- or six-membered ring;

each $R^{19}$ is independently hydrogen, $C_1$-$C_{20}$-alkyl, $C_2$-$C_2O$-alkenyl, $C_6$-$C_2O$-aryl or arylalkyl where alkyl has from 1 to 10 carbon atoms and aryl has from 6 to 20 carbon atoms, wherein $R^{19}$ can be substituted by halogen or nitrogen- or oxygen-containing groups or two $R^{19}$ radicals optionally bond to form a five- or six-membered ring;

s is 1, 2, or 3,

D is a neutral donor, and t is 0 to 2.

In at least one embodiment, the catalyst is a quinolinyldiamido transition metal complex represented by formulas (V) and (VI):

(V)

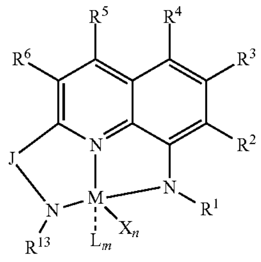

(VI)

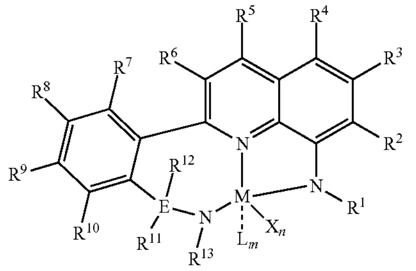

wherein:

M is a Group 3-12 metal;

J is a three-atom-length bridge between the quinoline and the amido nitrogen;

E is selected from carbon, silicon, or germanium;

X is an anionic leaving group;

L is a neutral Lewis base;

$R^1$ and $R^{13}$ are independently selected from the group consisting of hydrocarbyls, substituted hydrocarbyls, and silyl groups;

$R^2$ through $R^{12}$ are independently selected from the group consisting of hydrogen, hydrocarbyls, alkoxy, silyl, amino, aryloxy, substituted hydrocarbyls, halogen, and phosphino;

n is 1 or 2;

m is 0, 1, or 2 n+m is not greater than 4; and any two adjacent R groups (e.g. $R^1$ & $R^2$, $R^2$ & $R^3$, etc.) may be joined to form a substituted or unsubstituted hydrocarbyl or heterocyclic ring, where the ring has 5, 6, 7, or 8 ring atoms and where substitutions on the ring can join to form additional rings;

any two X groups may be joined together to form a dianionic group;

any two L groups may be joined together to form a bidentate Lewis base;

an X group may be joined to an L group to form a monoanionic bidentate group.

In some embodiments, M is a Group 4 metal, zirconium or hafnium. In some embodiments, J is an arylmethyl, dihydro-1H-indenyl, or tetrahydronaphthalenyl group. In some embodiments, E is carbon. In some embodiments, X is alkyl, aryl, hydride, alkylsilane, fluoride, chloride, bromide, iodide, triflate, carboxylate, or alkylsulfonate.

In some embodiments of the quinolinyldiamido transition metal complex represented by formulas (V) and (VI), L is an ether, amine or thioether. In some embodiments, $R^7$ and $R^8$ are joined to form a six membered aromatic ring with the joined $R^7$ and $R^8$ group being —CH═CHCH═CH—. In some embodiments, $R^{10}$ and $R^{11}$ are joined to form a five membered ring with the joined $R^{10}$ and $R^{11}$ groups being —$CH_2CH_2$—. In some embodiments, $R^{10}$ and $R^{11}$ are joined to form a six membered ring with the joined $R^{10}$ and $R^{11}$ groups being —$CH_2CH_2CH_2$—.

In some embodiments of the quinolinyldiamido transition metal complex represented by formulas (V) and (VI), $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In another embodiment, the catalyst is a phenoxyimine compound represented by the formula (VII):

(VII)

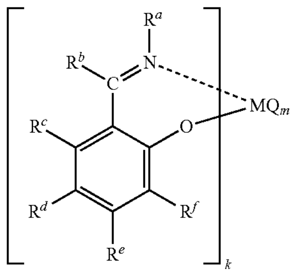

wherein M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^e$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the formula (VIII):

(VIII)

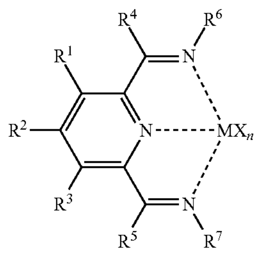

wherein:

M is Co or Fe; each X is an anion; n is 1, 2 or 3, so that the total number of negative charges on said anion or anions is equal to the oxidation state of a Fe or Co atom present in (VIII);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ is formula IX:

(IX)

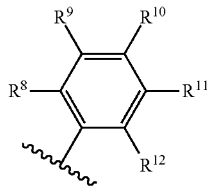

and $R^7$ is a group represented by formula X:

(X)

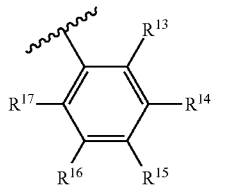

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are adjacent to one another, together may form a ring.

In at least one embodiment, the catalyst compound is represented by the formula (XI):

(XI)

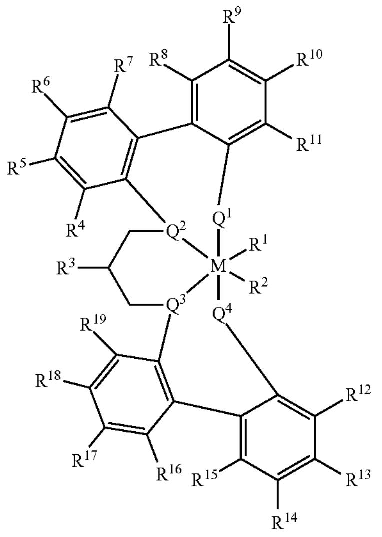

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ of Formula (XI) is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ of Formula (XI) are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. Preferably, $R^1$ and $R^2$ are chlorine.

Alternatively, $R^1$ and $R^2$ of Formula (XI) may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a $\pi$-complex with $M^1$.

Exemplary groups suitable for $R^1$ and or $R^2$ of Formula (XI) can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ of Formula (XI) is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —$NR'_2$, —SR', —OR, —$OSiR'_3$, —$PR'_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. In some embodiments, $R^6$ and $R^{17}$ are $C_{1-40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ of Formula (XI) is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. Preferably, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ of Formula (XI) is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

In some embodiments, $R^3$ of Formula (XI) is a hydrocarbyl comprising a vinyl moiety. As used herein, "vinyl" and "vinyl moiety" are used interchangeably and include a terminal alkene, e.g. represented by the structure

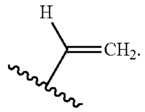 [SMILES: *C=C]

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). Preferably, $R^3$ is $C_1$-$C_{40}$ unsaturated alkyl that is vinyl or substituted $C_1$-$C_{40}$ unsaturated alkyl that is vinyl. $R^3$ can be represented by the structure —R'CH═$CH_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ of Formula (XI) is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

(XII)

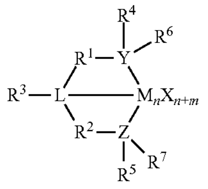

(XIII)

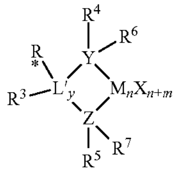

wherein M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ of Formulas (XII) or (XIII) are independently a group represented by formula (XIV):

(XIV)

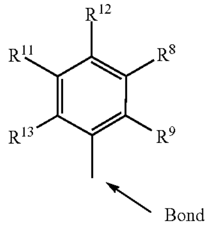

wherein $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ of Formulas (XII) or (XIII) are both a group represented by formula (XV):

(XV)

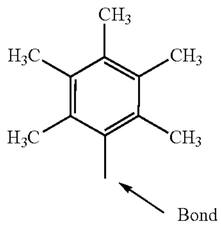

wherein M is a Group 4 metal, such as zirconium, titanium, or hafnium. In at least one embodiment, M is zirconium. Each of L, Y, and Z may be a nitrogen. Each of $R^1$ and $R^2$ may be $—CH_2—CH_2—$. $R^3$ may be hydrogen, and $R^6$ and $R^7$ may be absent.

In at least one embodiment, an amount of alumoxane is up to a 5000-fold molar excess Al/M over the catalyst compound (per metal catalytic site). A lower amount of alumoxane-to-catalyst-compound can be a 1:1 molar ratio. Alternate ranges include from 1:1 to 500:1, alternately 1:1 to 200:1, alternately 1:1 to 100:1, or alternately 1:1 to 50:1.

Activator

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators typically include alumoxane compounds, modified alumoxane compounds, and ionizing anion precursor compounds that abstract a reactive, 6-bound, metal ligand making the metal complex cationic and providing a charge-balancing non-coordinating or weakly coordinating anion.

Alumoxane Activators

Alumoxane activators are utilized as activators in the catalyst systems described herein. Alumoxanes are generally oligomeric compounds containing $—Al(R^1)—O—$ sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5,000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Non Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), in combination with the alumoxane or modified alumoxane activators. It is also within the scope of the present disclosure to use neutral or ionic activators in combination with the alumoxane or modified alumoxane activators.

The catalyst systems of the present disclosure can include at least one non-coordinating anion (NCA) activator. Specifically, the catalyst systems may include an NCAs which either do not coordinate to a cation or which only weakly coordinate to a cation thereby remaining sufficiently labile to be displaced during polymerization.

The terms "cocatalyst" and "activator" are used herein interchangeably and are defined to be any compound which can activate any one of the catalyst compounds described above by converting the neutral catalyst compound to a catalytically active catalyst compound cation.

In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. Such as $Z_d^+$ is triphenyl carbonium. Reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L\text{-}H)_d^+$, it is preferably a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The activating cation $Z_d^+$ may also be a moiety such as $[R^{1'}, R^{2'}, R^{3'}EH]^{d+}$, where E is N or P, d is 1 2 or 3, and $R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein together $R^{1'}$, $R^{2'}$, and $R^{3'}$ comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Useful cation components, $Z_d^+$, include those represented by the formula:

10

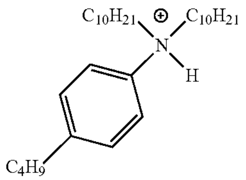

11

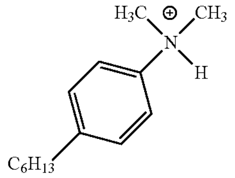

12

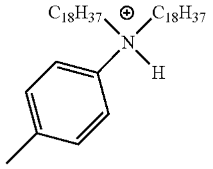

13

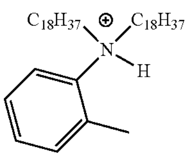

14

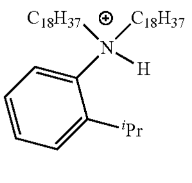

-continued
15
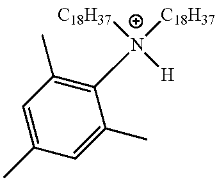
16
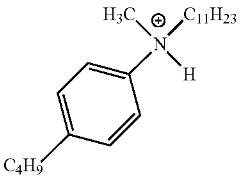
17
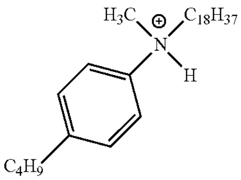
18
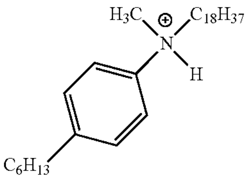
19
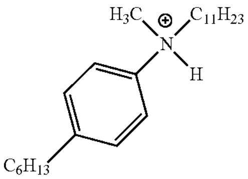
20
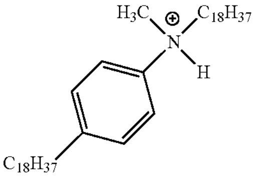
21
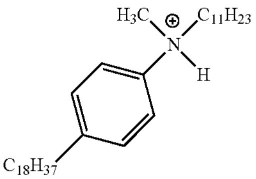
22
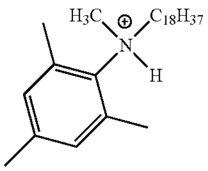
-continued
23
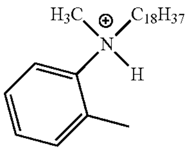
24
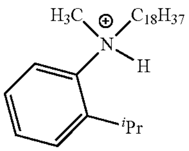
25
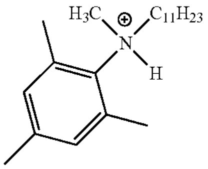
26
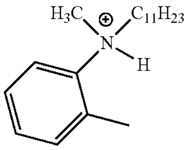
27
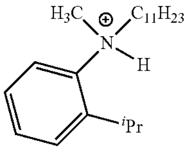
28
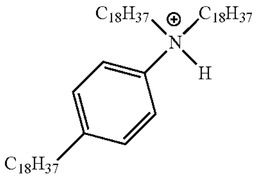
29
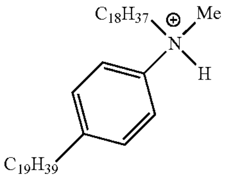
30
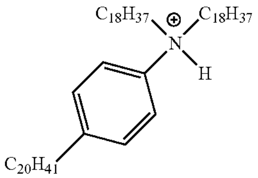
31
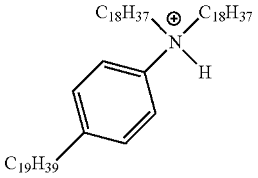

-continued

32 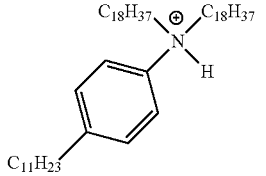

33 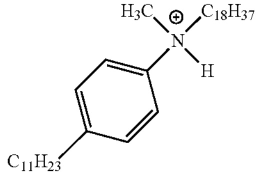

34 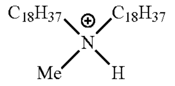

35 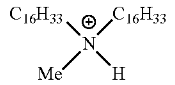

36 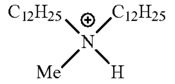

Useful cation components, $Z_d^+$, include those represented by the formulas:

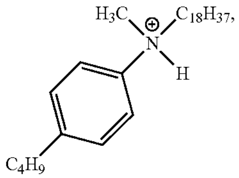

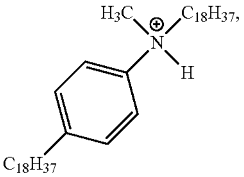

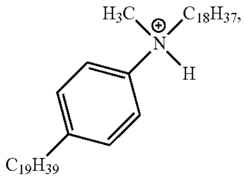

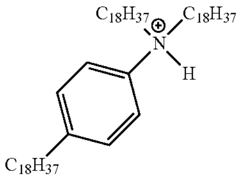

and

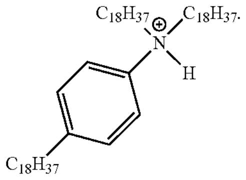

The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

For example, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

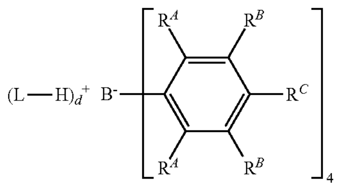

or

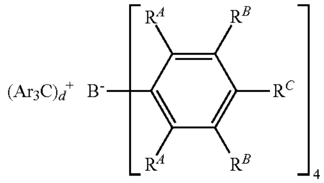

where:

each $R^A$ is independently a halide, such as a fluoride;

Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

L is a Lewis base; $(L\text{-}H)^+$ is a Bronsted acid; d is 1, 2, or 3;

where the anion has a molecular weight of greater than 1,020 g/mol; and where at least three of the substituents on the B atom each have a molecular volume of greater than 250 cubic Å, alternatively greater than 300 cubic Å, or alternatively greater than 500 cubic Å. For example, the anion has a molecular weight of greater than 700 g/mol, and, preferably, at least three of the substituents on the boron atom each have a molecular volume of greater than 180 cubic Å.

For example, $(Ar_3C)_d^+$ is $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

TABLE 1

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Activators can include N,N-dimethylanilinium tetrakis (perfluoronaphthyl)borate, N,N-dimethylanilinium tetrakis (perfluorobiphenyl)borate, N,N-dimethylanilinium tetrakis (perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis (pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

Activator compounds that are particularly useful in this invention include one or more of:

N,N-di(hydrogenated tallow)methylammonium[tetrakis (perfluorophenyl) borate],

N-methyl-4-nonadecyl-N-octadecylanilinium[tetrakis(perfluorophenyl)borate],

N-methyl-4-hexadecyl-N-octadecylanilinium[tetrakis(perfluorophenyl)borate],

N-methyl-4-tetradecyl-N-octadecylanilinium[tetrakis(perfluorophenyl)borate],

N-methyl-4-dodecyl-N-octadecylanilinium[tetrakis(perfluorophenyl)borate],

N-methyl-4-decyl-N-octadecylanilinium[tetrakis(perfluorophenyl)borate],

N-methyl-4-octyl-N-octadecylanilinium[tetrakis(perfluorophenyl)borate],

N-methyl-4-hexyl-N-octadecylanilinium[tetrakis(perfluorophenyl)borate],

N-methyl-4-butyl-N-octadecylanilinium[tetrakis(perfluorophenyl)borate],

N-methyl-4-octadecyl-N-decylanilinium[tetrakis(perfluorophenyl)borate],

N-methyl-4-nonadecyl-N-dodecylanilinium[tetrakis(perfluorophenyl)borate],

N-methyl-4-nonadecyl-N-tetradecylanilinium[tetrakis(perfluorophenyl)borate],

N-methyl-4-nonadecyl-N-hexadecylanilinium[tetrakis(perfluorophenyl)borate],

N-ethyl-4-nonadecyl-N-octadecylanilinium[tetrakis(perfluorophenyl)borate],

N-methyl-N,N-dioctadecylammonium[tetrakis(perfluorophenyl)borate],

N-methyl-N,N-dihexadecylammonium[tetrakis(perfluorophenyl)borate],

N-methyl-N,N-ditetradecylammonium[tetrakis(perfluorophenyl)borate],

N-methyl-N,N-didodecylammonium[tetrakis(perfluorophenyl)borate],

N-methyl-N,N-didecylammonium[tetrakis(perfluorophenyl)borate],

N-methyl-N,N-dioctylammonium[tetrakis(perfluorophenyl) borate],

N-ethyl-N,N-dioctadecylammonium[tetrakis(perfluorophenyl)borate],

N,N-di(octadecyl)tolylammonium[tetrakis(perfluorophenyl)borate],

N,N-di(hexadecyl)tolylammonium[tetrakis(perfluorophenyl)borate],

N,N-di(tetradecyl)tolylammonium[tetrakis(perfluorophenyl)borate],

N,N-di(dodecyl)tolylammonium[tetrakis(perfluorophenyl)borate],
N-octadecyl-N-hexadecyl-tolylammonium[tetrakis(perfluorophenyl)borate],
N-octadecyl-N-hexadecyl-tolylammonium[tetrakis(perfluorophenyl)borate],
N-octadecyl-N-tetradecyl-tolylammonium[tetrakis(perfluorophenyl)borate],
N-octadecyl-N-dodecyl-tolylammonium[tetrakis(perfluorophenyl)borate],
N-octadecyl-N-decyl-tolylammonium[tetrakis(perfluorophenyl)borate],
N-hexadecyl-N-tetradecyl-tolylammonium[tetrakis(perfluorophenyl)borate],
N-hexadecyl-N-dodecyl-tolylammonium[tetrakis(perfluorophenyl)borate],
N-hexadecyl-N-decyl-tolylammonium[tetrakis(perfluorophenyl)borate],
N-tetradecyl-N-dodecyl-tolylammonium[tetrakis(perfluorophenyl)borate],
N-tetradecyl-N-decyl-tolylammonium[tetrakis(perfluorophenyl)borate],
N-dodecyl-N-decyl-tolylammonium[tetrakis(perfluorophenyl)borate],
N-methyl-N-octadecylanilinium[tetrakis(perfluorophenyl)borate],
N-methyl-N-hexadecylanilinium[tetrakis(perfluorophenyl)borate],
N-methyl-N-tetradecylanilinium[tetrakis(perfluorophenyl)borate],
N-methyl-N-dodecylanilinium[tetrakis(perfluorophenyl)borate],
N-methyl-N-decylanilinium[tetrakis(perfluorophenyl)borate], and
N-methyl-N-octylanilinium[tetrakis(perfluorophenyl)borate].

Additional useful activators and the synthesis of useful non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Particularly useful activators also include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

The typical NCA activator-to-catalyst ratio, e.g., all NCA activators-to-catalyst ratio is about a 1:1 molar ratio. Alternate ranges include from 0.1:1 to 100:1, alternately from 0.5:1 to 200:1, alternately from 1:1 to 500:1 alternately from 1:1 to 1000:1. A particularly useful range is from 0.5:1 to 10:1, such as 1:1 to 5:1.

Activators useful herein also include those described in U.S. Pat. No. 7,247,687 at column 169, line 50 to column 174, line 43, particularly column 172, line 24 to column 173, line 53.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 1994/007928, and WO 1995/014044 which discuss the use of an alumoxane in combination with an ionizing activator).

The catalyst systems used herein preferably contain 0 ppm (alternately less than 1 ppm) of residual aromatic hydrocarbon. Preferably, the catalyst systems used herein contain 0 ppm (alternately less than 1 ppm) of residual toluene.

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula $AlR_3$, $ZnR_2$ (where each R is, independently, a $C_1$-$C_8$ aliphatic radical, such as methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

Solvents

Suitable diluents/solvents for polymerization include non-coordinating, inert liquids. In some embodiments, suitable solvents include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins that can be polymerized including ethylene, propylene, 1-butene, 1-hexene, 1-pentene, 3-methyl-1-pentene, 4-methyl-1-pentene, 1-octene, 1-decene, and mixtures thereof. In some embodiments, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof.

Polyolefin Products

The present disclosure relates to compositions of matter produced by processes described herein.

In some embodiments, a process described herein produces $C_2$ to $C_{20}$ olefin homopolymers (e.g., polyethylene; polypropylene), or $C_2$ to $C_{20}$ olefin copolymers (e.g., ethylene-octene, ethylene-propylene) and/or propylene-alpha-olefin copolymers, such as $C_3$ to $C_{20}$ copolymers (such as propylene-hexene copolymers or propylene-octene copolymers).

In some embodiments, an ethylene or propylene based polymer is an ethylene alpha-olefin copolymer or propylene alpha-olefin copolymer having one or more of: an Mw value of 100,000 g/mol or greater, such as from about 100,000 g/mol to about 1,500,000 g/mol, such as from about 100,000 g/mol to about 500,000 g/mol, such as from about 180,000 g/mol to about 200,000 g/mol; an Mn value of 50,000 g/mol or greater, such as from about 50,000 g/mol to about 2,300,000 g/mol, such as from about 80,000 g/mol to about 200,000 g/mol, such as about 90,000 g/mol to about 120,000 g/mol.

In some embodiments, the polymer or copolymer has a comonomer content of from about 0.1 wt % to about 99 wt %, such as from about 1 wt % to about 40 wt %, such as from about 3 wt % to about 33 wt %, such as from about 15 wt % to about 30 wt %, alternatively from about 40 wt % to about 95 wt %. In some embodiments, the polyolefin product is a copolymer of ethylene and propylene with an ethylene content of from about 1 wt % to about 40 wt %, such as from about 3 wt % to about 33 wt %, such as about 25 wt % to about 33 wt %, such as about 31 wt %.

In some embodiments, the ethylene alpha-olefin copolymer or propylene alpha-olefin copolymer has a polydispersity index (PDI) as measured by Mw/Mn of from about 1 to about 5, such as from about 2 to about 4, such as from about 1.5 to about 3.1. In some embodiments, the PDI is less than 2.3, such as about 1.8 to about 2.2.

In some embodiments, the ethylene alpha-olefin copolymer or propylene alpha-olefin copolymer has a melting point (Tm) of at least 40 °C, such as at least 80 °C, such as from about 90 °C to about 150 °C, alternatively from about 110 °C to about 130 °C.

In some embodiments, the ethylene alpha-olefin copolymer or propylene alpha-olefin copolymer has a melt flow rate (MFR) of about 0.1 to about 200 g/10 min, such as about 2.0 to about 50 g/10 min, or about 1.5 to about 3.8 g/10 min, according to ASTM 1238.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 wt % to 90 wt %, such as at least 70 to 90 wt %.

The blends described above may be produced by mixing the polymers of the present disclosure with one or more polymers (as described above), by connecting reactors together in series or in parallel to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

Any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 μm to 50 μm can be suitable. Films intended for packaging can be from 10 μm to 50 μm thick. The thickness of the sealing layer can be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Unless otherwise stated, all percentages, parts, ratios, etc., are by weight. Unless otherwise stated, a reference to a compound or component includes the compound or component by itself, as well as in combination with other compounds or components, such as mixtures of compounds. Further, when an amount, concentration, or other value or parameter is given as a list of upper values and lower values, this is to be understood as specifically disclosing all ranges formed from any pair of an upper value and a lower value, regardless of whether ranges are separately disclosed.

Characterization

GPC 4-D

The distribution and the moments of molecular weight (Mw, Mn, Mw/Mn, etc.), the comonomer content are determined by using a high temperature Gel Permeation Chromatography (Polymer Char GPC-IR) equipped with a multiple-channel band-filter based Infrared detector IR5. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 m Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145 °C. Given amount of polymer sample is weighed and sealed in a standard vial with 10 μL flow marker (Heptane) added to it. After loading the vial in the autosampler, polymer is automatically dissolved in the instrument with 8 mL added TCB solvent. The polymer is dissolved at 160 °C with continuous shaking for about 2 hours. The TCB densities used in concentration calculation are 1.463 g/ml at room temperature and 1.284 g/ml at 145 °C. The sample solution concentration is around 1.0 mg/ml.

The concentration (c) at each point in the chromatogram is calculated from the baseline-subtracted IR5 broadband signal intensity (I), using the following equation:

$$c=\beta I$$

where β is the mass constant determined with homo PE standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation.

$$\log M = \frac{\log(K_{PS}/K)}{a+1} + \frac{a_{PS}+1}{a+1}\log M_{PS}$$

where the variables with subscript "PS" stands for polystyrene while those without a subscript are for the test samples. In this method, $a_{PS}$=0.67 and $K_{PS}$=0.000175 while a and K are calculated from a series of empirical formula established in ExxonMobil and published in literature based on comonomer content (T. Sun, P. Brant, R. R. Chance, and W. W. Graessley, Macromolecules, Volume 34, Number 19, pp. 6812-6820, (2001)). In this study, the a=0.702~0.703 and the K=0.000278~0.000236 dL/g.

The comonomer composition or C2 content in EP copolymers is determined by the ratio of the IR5 detector intensity corresponding to $CH_2$ and $CH_3$ channel calibrated with a series of PE and PP homo/copolymer standards whose nominal value are predetermined by NMR or FTIR such as EMCC commercial grades about LLDPE, Vistamaxx, ICP, etc.

All the concentration is expressed in g/cm$^3$, molecular weight is expressed in g/mole, and intrinsic viscosity is expressed in dL/g unless otherwise noted.

Additional Aspects

The present disclosure provides, among others, the following embodiments, each of which may be considered as optionally including any alternate embodiments:

1. A process for polymerization, comprising:
   introducing a feed comprising a solvent, a first monomer that is propylene to a continuous or semi-continuous reactor under reactor conditions comprising a pressure of about 1 MPa to about 5 MPa and a temperature of about 60 °C to about 120 °C; and
   introducing a catalyst system to the feed to form a biphasic product comprising a first portion and a second portion, the first portion comprising a polymer having a polydispersity index of 1.5 to 15 and molecular weight of 50,000 g/mol or greater, according to GPC-4D.

Clause 2. The process of Clause 1, further comprising a second monomer, wherein the first monomer is propylene and the second monomer is ethylene.

Clause 3. The process of Clause 1 or 2, further comprising measuring a turbidity of the biphasic product to determine a first turbidity measurement; adjusting a temperature or pressure of reactor; and determining a second turbidity measurement.

Clause 4. The process of claim 1, wherein the polymer has a melt flow rate of about 2 to about 3.3 g/10 min, according to ASTM 1238.

Clause 5. The process of any of Clauses 1 to 4, wherein the biphasic product comprises an unstable turbidity reading and/or turbidity of greater than 120 NTU.

Clause 6. The process of any of Clauses 1 to 5, wherein the polydispersity index is about 2.0 to about 10.

Clause 7. The process of any of Clauses 1 to 6, wherein the solvent is an aromatic solvent, aliphatic solvent, or combination(s) thereof.

Clause 8. The process of any of Clauses 1 to 7, wherein the reactor is a continuous stirred tank reactor or a continuous loop reactor.

Clause 9. The process of Clause 8, wherein the reactor is a continuous loop reactor, the reactor comprising one or more heat exchangers disposed along the reactor.

Clause 10. The process of any of Clauses 1 to 9, wherein the molecular weight is about 100,000 g/mol to about 400,000 g/mol.

Clause 11. A process for polymerization, comprising: introducing a solvent, a first monomer, and a second monomer to a catalyst and an activator to form a solution in a continuous loop reactor under polymerization conditions comprising a pressure of about 1 MPa to about 5 MPa and a temperature of about 60 °C to about 120 °C; mixing the solution to form a product; measuring a turbidity of the product; and adjusting or maintaining at least the pressure or the temperature of the reactor to increase or maintain the turbidity of the biphasic product to greater than 120 NTU as measured by a turbidity meter coupled to an outlet of the reactor, wherein the product comprises a polymer having a polydispersity index of 1.5 to 15, and molecular weight of 50,000 g/mol or greater, according to GPC-4D.

Clause 12. The process of Clause 11, wherein the product is a biphasic product comprising a first liquid phase and a second liquid phase.

Clause 13. The process of Clause 12, wherein the first liquid phase comprises (1) unreacted monomer comprising the first and second monomer, (2) about 10 wt % to about 30 wt % polymer, and (3) the solvent, based on the weight of the first liquid phase.

Clause 14. The process of Clause 13, wherein the first liquid phase comprises about 20 wt % to about 50 wt % of unreacted monomer, based on the weight of the first liquid phase.

Clause 15. The process of any of Clauses 12 to 14, wherein the second liquid phase comprises (1) unreacted monomer comprising the first and second monomer, (2) about 0 wt % to about 10 wt % polymer, and (3) the solvent, based on the weight of the second liquid phase.

Clause 16. The process of any of Clauses 12 to 15, wherein the second liquid phase comprises about 25 wt % to about 55 wt % of unreacted monomer, based on the weight of the second liquid phase.

Clause 17. The process of any of Clauses 12 to 16, wherein the biphasic product comprises about 20 wt % to 40 wt % of the first liquid phase and about 70 wt % to 80 wt % of the second liquid phase, based on the weight of the biphasic product.

Clause 18. The process of any of Clauses 11 to 17, wherein adjusting or maintaining at least the pressure or the temperature of the reactor further comprises measuring temperatures along the reactor using a plurality of temperature sensors.

Clause 19. The process of Clause 18, further comprising adjusting one more set points for one or more heat exchangers disposed along the reactor based on the temperatures measured along the loop reactor.

Clause 20. A process for polymerization comprising:

introducing a feed comprising a solvent, a first composition comprising propylene and an optional first comonomer to a continuous or semi-continuous reactor;

introducing a catalyst composition to the reactor at a first catalyst flow rate to provide a first solution;

mixing the first solution at a first set of operating conditions comprising a first temperature and a first pressure to form a first product;

transitioning the reactor to a second set of operating conditions to form a second solution, the transitioning comprising:

adjusting the reactor to a second pressure of about 1 MPa to about 5 MPa;

adjusting the reactor to a second temperature of about 60 °C to about 120 °C;

adjusting the first composition to a second composition comprising propylene and an optional second comonomer that is the same or different than the first comonomer; and/or adjusting the first catalyst flow rate of the catalyst composition to a second catalyst flow rate; and mixing the second solution to form a second biphasic product, the second biphasic product having a turbidity of greater than 120 NTU as measured by a turbidity meter coupled to an outlet of the reactor, the second product comprising a polymer having a polydispersity index of about 1.5 to about 15 and molecular weight of about 50,000 g/mol or greater, according to GPC-4D.

EXAMPLES

Example 1

A continuous loop reactor represented in FIG. 1 was used to produce a comparative single phase product and an example biphasic product. A feed stream including solvent (isohexane), propylene, and ethylene was introduced to the reactor at a controlled inlet temperature of 89.51 °C and a reactor pressure of 3.99 MPa. The feed stream was introduced at a feed flow rate of 45.18 kg/hr with a propylene feed rate of 15.0 kg/hr and an ethylene feed rate of 2.5 kg/hr. A single-site, ansa-metallocene catalyst and N,N-dimethylanilinium tetra(perfluorophenyl)borate activator was delivered to the loop reactor at different locations of the loop reactor. The catalyst system, including activator flow rate was 14.87 mg/hr. A software was used to make multi-phase pressure, volume, and temperature (PVT) flash calculations based on Perturbed-Chain Statistical Association Fluid Theory (PC-SAFT). A phase diagram was generated such as the diagram provided in FIG. 2. The resulting diagram was used to determine the operating condition and operating windows. In particular, the operating window for the comparative single phase product was in region 202 and the operating window for the example biphasic product was in region 204.

A turbidity meter was installed near the product outlet of the loop reactor to monitor phase separation behavior in real time. The comparative product operated the reactor at steady state under the operating conditions for single phase solution polymerization. The turbidity meter was closely monitored during the run and remained around 105 NTU. A comparative sample was collected once the system reached steady state. The comparative sample results and operating conditions are summarized in Table 2.

The feed rates and temperature was maintained as described for the comparative product, and the pressure was lowered to reach the condition for the biphasic product. The turbidity meter provided unsteady readings above 120 NTU and that reached as high as 499 NTU. Two samples were taken in the biphasic system and were characterized and summarized in Table 2.

TABLE 2

Summary of Operation Conditions and Product Properties.

| | Comparative 1 | Biphasic Sample 1 | Biphasic Sample 2 |
|---|---|---|---|
| Reactor Pressure (MPa) | 3.99 | 3.99 | 3.65 |
| Outlet Temperature (° C.) | 92.78 | 92.45 | 92.77 |
| Inlet Temperature (° C.) | 89.51 | 89.47 | 89.69 |
| Catalyst Flowrate (mg/hr) | 14.87 | 15.02 | 15.02 |
| C3 Feed Rate (kg/hr) | 15.00 | 15.00 | 15.00 |
| C2 Feed Rate (kg/hr) | 2.50 | 2.50 | 2.50 |
| Polymer wt % in Exit | 4.85 | 6.26 | 6.33 |
| Production Rate (kg/hr) | 2.19 | 2.86 | 2.85 |

TABLE 2-continued

Summary of Operation Conditions and Product Properties.

| | Comparative 1 | Biphasic Sample 1 | Biphasic Sample 2 |
|---|---|---|---|
| C2 wt % in Polymer | 31.30 | 31.24 | 31.67 |
| Melt Flow Rate (g/10 min) | 3.07 | 3.14 | 2.24 |
| Mw (g/mol) | 188000 | 190800 | 187900 |
| Mn (g/mol) | 94000 | 96500 | 93700 |
| Polymer Dispersity Index | 2.00 | 1.99 | 2.01 |
| Bulk $CH_3$/1000 TC | 244.51 | 243.85 | 245.33 |
| Bulk Comonomer (GPC-4D) | 26.65 | 26.84 | 26.40 |

As can be seen in Table 2, the biphasic samples had similar weight compositions and molecular weight distribution when compared to the comparative sample composition. Thus, a copolymer can be provided using a broad operating window including a single phase and/or biphasic operating conditions.

Example 2

Based on some representative operating conditions, a flash calculation was performed using the PC-SAFT based thermodynamic software, and the results are summarized in Table 3.

TABLE 3

Flash Results of Biphasic Sample.

| | | Phase 1 | Phase 2 |
|---|---|---|---|
| Ethylene (wt %) | 5.0 | 4.3 | 5.3 |
| Propylene (wt %) | 30.0 | 26.3 | 31.5 |
| Solvent (wt %) | 60 | 53.2 | 62.7 |
| Polymer (wt %) | 5.0 | 16.1 | 0.5 |
| Phase Fraction (wt %) | N/A | 28.8 | 71.2 |
| Density (g/ml) | | 0.538 | 0.4944 |
| Temperature (° C.) | 95 | 95 | 95 |
| Pressure (MPa) | 3.10 | 3.10 | 3.10 |

The polymer rich phase (Phase 1) included 16.1 wt % of polymer and the polymer lean phase (Phase 2) included 0.5 wt % polymer, according to the modeling results. Surprisingly, the resulting biphasic polymer has similar or equivalent properties as that from a solution process. It would be expected that the molecular weight distribution and the composition distribution would be wider, but unexpectedly they are not, and further the PDI is low where it would be expected to be higher.

For purposes of the present disclosure, the numbering scheme for the Periodic Table Groups is used as described in CHEMICAL AND ENGINEERING NEWS, 63(5), pg. 27 (1985). Therefore, a "Group 4 metal" is an element from group 4 of the Periodic Table, e.g., Hf, Ti, or Zr.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer", "ethylene copolymer", or "polyethylene" is a polymer or copolymer comprising at least 50 mole % ethylene derived units, a "propylene polymer", "propylene copolymer", or "polypropylene" is a polymer or copolymer comprising at least 50 mole % propylene derived units, and so on.

As used herein, and unless otherwise specified, the term "$C_n$" means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Example hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Unless otherwise indicated, (e.g., the definition of "substituted hydrocarbyl", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic (or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic (or polycyclic ring structure), or where at least one heteroatom has been inserted within a hydrocarbyl ring.

The terms "alkyl radical," and "alkyl" are used interchangeably throughout this disclosure. For purposes of this disclosure, "alkyl radical" is defined to be $C_1$-$C_{100}$ alkyls, that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic (or polycyclic ring structure), or where at least one heteroatom has been inserted within a hydrocarbyl ring.

The terms "alkoxy" or "alkoxide" mean an alkyl or aryl group bound to an oxygen atom, such as an alkyl ether or aryl ether group/radical connected to an oxygen atom and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and aryloxy radicals can include methoxy, ethoxy, n-propoxy, iso-propoxy, n-butoxy, iso-butoxy, sec-butoxy, tert-butoxy, phenoxyl, and the like.

The term "aryl" or "aryl group" means an aromatic ring (typically made of 6 carbon atoms) such as phenyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tertbutyl).

A "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluorenyl, tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g $mol^{-1}$).

A "catalyst system" is a combination of at least one catalyst compound, at least one activator, an optional co-activator, and an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulas herein embrace both neutral and ionic forms of the catalyst compounds and activators.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, the present disclosure is not limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A process for polymerization, comprising:

introducing a feed comprising a solvent, a first monomer that is propylene to a continuous or semi-continuous reactor under reactor conditions comprising a pressure of about 1 MPa to about 5 MPa and a temperature of about 60 °C to about 120 °C; and introducing a catalyst system to the feed to form a biphasic product comprising a first portion and a second portion, the first portion comprising a propylene based polymer having a polydispersity index of about 1.5 to about 15 and molecular weight of about 50,000 g/mol or greater, according to GPC-4D.

2. The process of claim 1, further comprising a second monomer, wherein the first monomer is propylene and the second monomer is ethylene.

3. The process of claim 1, further comprising measuring a turbidity of the biphasic product to determine a first turbidity measurement;

adjusting a temperature or pressure of reactor; and determining a second turbidity measurement.

4. The process of claim 1, wherein the polymer has a melt flow rate of about 2 to about 3.3 g/10 min, according to ASTM 1238.

5. The process of claim 1, wherein the biphasic product comprises a turbidity of greater than 120 NTU.

6. The process of claim 1, wherein the polydispersity index is about 2 to about 10.

7. The process of claim 1, wherein the solvent is an aromatic solvent, an aliphatic solvent, or combination(s) thereof.

8. The process of claim 1, wherein the reactor is a continuous stirred tank reactor or a continuous loop reactor.

9. The process of claim 8, wherein the reactor is a continuous loop reactor, the reactor comprising one or more heat exchangers disposed along the continuous loop reactor.

10. The process of claim 1, wherein the molecular weight is about 100,000 g/mol to about 400,000 g/mol.

11. A process for polymerization, comprising:

introducing a solvent, a first monomer, and a second monomer to a catalyst and an activator to form a solution in a continuous loop reactor under polymerization conditions comprising a pressure of about 1 MPa to about 5 MPa and a temperature of about 60 °C to about 120 °C;

mixing the solution to form a biphasic product;

measuring a turbidity of the biphasic product; and adjusting or maintaining at least the pressure or the temperature of the reactor to increase or maintain the turbidity of the biphasic product to greater than 120 NTU as measured by a turbidity meter coupled to an outlet of the reactor, wherein the biphasic product comprises a polymer having a polydispersity index of about 2.3 or less and molecular weight of from about 180,000 g/mol to about 200,000 g/mol, according to GPC-4D.

12. The process of claim 11, wherein the biphasic product comprises a first liquid phase and a second liquid phase.

13. The process of claim 12, wherein the first liquid phase comprises (1) unreacted monomer comprising the first and second monomer, (2) about 10 wt % to about 30 wt % polymer, and (3) the solvent, based on the weight of the first liquid phase.

14. The process of claim 13, wherein the first liquid phase comprises about 20 wt % to about 50 wt % of unreacted monomer, based on the weight of the first liquid phase.

15. The process of claim 12, wherein the second liquid phase comprises (1) unreacted monomer comprising the first and second monomer, (2) about 0 wt % to about 10 wt % polymer, and (3) the solvent, based on the weight of the second liquid phase.

16. The process of claim 15, wherein the second liquid phase comprises about 25 wt % to about 55 wt % of unreacted monomer, based on the weight of the second liquid phase.

17. The process of claim 12, wherein the biphasic product comprises about 20 wt % to 40 wt % of the first liquid phase and about 70 wt % to 80 wt % of the second liquid phase, based on the weight of the biphasic product.

18. The process of claim 11, wherein adjusting or maintaining at least the pressure or the temperature of the reactor further comprises measuring temperatures along the reactor using a plurality of temperature sensors.

19. The process of claim 18, further comprising adjusting one more set points for one or more heat exchangers disposed along the reactor based on the temperatures measured along the loop reactor.

20. A process for polymerization comprising:

introducing a feed comprising a solvent, a first composition comprising propylene and an optional first comonomer to a continuous or semi-continuous reactor;

introducing a catalyst composition to the reactor at a first catalyst flow rate to provide a first solution;

mixing the first solution at a first set of operating conditions comprising a first temperature and a first pressure to form a first product;

transitioning the reactor to a second set of operating conditions to form a second solution, the transitioning comprising:

adjusting the reactor to a second pressure of about 1 MPa to about 5 MPa;

adjusting the reactor to a second temperature of about 60 °C to about 120 °C;

adjusting the first composition to a second composition comprising propylene and an optional second comonomer that is the same or different than the first comonomer; and/or adjusting the first catalyst flow rate of the catalyst composition to a second catalyst flow rate; and mixing the second solution to form a second biphasic product, the second biphasic product having a turbidity of greater than 120 NTU as measured by a turbidity meter coupled to an outlet of the reactor, the second product comprising a polymer having a polydispersity index of about 1.5 to about 15 and molecular weight of about 50,000 g/mol or greater, according to GPC-4D.

* * * * *